Nov. 24, 1931.  F. NEWTON  1,833,403

WIND TURBINE

Filed Oct. 14, 1926

INVENTOR.
Frederick Newton.
by:- A. F. Odell
Attorney.

Patented Nov. 24, 1931

1,833,403

UNITED STATES PATENT OFFICE

FREDERICK NEWTON, OF DERBY, ENGLAND

WIND TURBINE

Application filed October 14, 1926, Serial No. 141,609, and in Great Britain October 22, 1925.

This invention relates to means for adjusting and automatically controlling the speed of rotation of a windmill; and is especially applicable to windmills carried on aircraft, which by the aid of the invention may be adapted for craft of different speed and caused to run at a predetermined speed in spite of a wide range of variation in the speed of the carrier vessel.

Automatic control of the speed is obtained by making each blade revoluble about its own axis in the hub, and providing a radially guided weight sliding under centrifugal forces against the action of a spring, projections from the weight engaging and holding in register mutually inclined slots in the blade and hub. The blades are preferably mounted in ball bearings, and the slots may be formed in extensions of the ball races, one of which may also serve to guide the weight. Provision may be made for adjusting one of the slotted members with respect to the blade or hub of which it forms part in order to vary the setting of the blade for a given position of the control weight. In order that all the blades may move equally under the automatic adjustment each may have a projection engaging in a common spider rotatable on the shaft of the windmill.

A construction according to the invention is illustrated in the accompanying drawings in which, Figure 1 is in part an axial section of the hub and root of a blade and in part an elevation of the interior of the hub.

Figure 1:
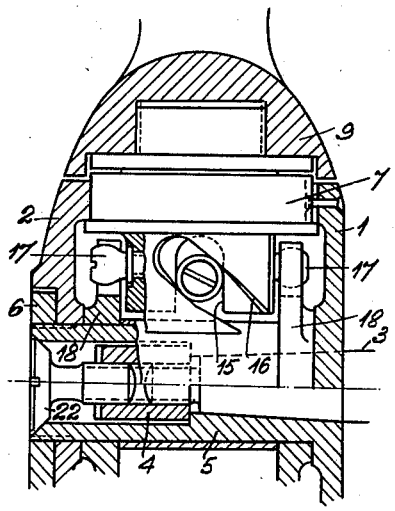
Figure 3:
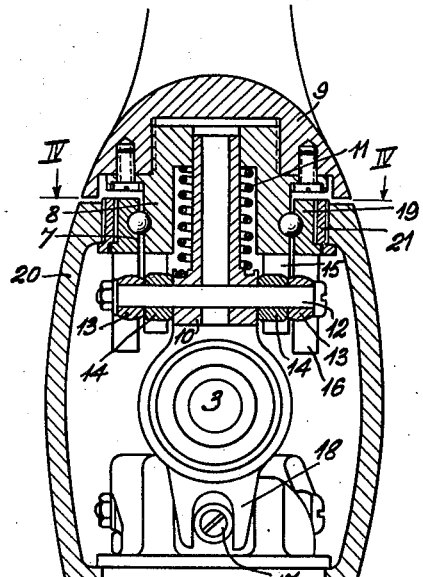
Figure 3 is a sectional elevation at right angles to Figure 1.
Figure 2:
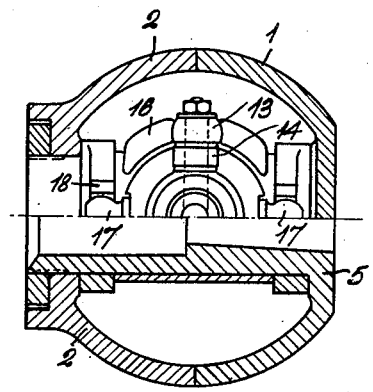
Figure 2 is a part axial sectional plan of the hub and in part a plan view of the interior of the hub.
Figure 4:
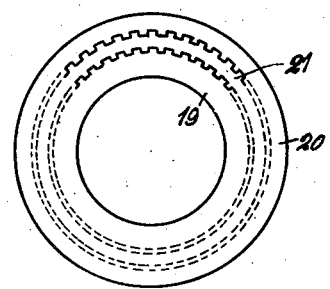
Figure 4 is a sectional plan on the line IV—IV of Figure 3 of a modified detail.

The hub of the propeller is formed in two parts 1, 2 the former of which is constructed with a central sleeve 5 secured upon the coned end 3 of the shaft to be driven by means of a sleeve nut 4 screwing on the reduced end of the shaft and locked by the set screw 22 the head of which closes the hollow end of the shaft. The other half of the hub is secured on the sleeve 5 by a ring nut 6. Between these two parts of the hub are secured the outer races 7 of ball bearings of which the inner races 8 are secured to the respective blades 9. Within each inner race there slides a weight 10 pressed towards the shaft 3 by a spring 11. A transverse pin 12 passing through the weight 10 carries rollers 13 and 14 engaging in mutually inclined slots in prolongations of the races 7 and 8. In the construction shown the inner race secured to the blade has straight slots 15 and the projection from the outer race has slanting slots 16; the rollers 14 are accordingly made cylindrical and the rollers 13 spherical.

In order that the several blades may move together each carries a projection 17 engaging in a common spider 18 rotatable upon the sleeve 5. In the construction shown there are two spiders and each blade has two projections.

As the speed of rotation of the shaft 3 increases the weight 10 moves outward against the pressure of the spring 11. As a consequence its transverse pins 12 cause the blade 9 to rotate upon its axis so as to be set more nearly edgewise to the wind. Should the springs 11 or the weights 10 of the several blades be dissimilar the blades will nevertheless rotate together to the same extent by virtue of the connection 17, 18.

In order that the pitch of the blades with the windmill at rest may be altered within the limits allowed by the spider 18 and also to obtain relatively fine adjustment. The outer race of the ball bearings may be constructed in two parts 19 and 20 which are differentially serrated or toothed on their outer or inner surfaces respectively, that is to say have slightly different numbers of serrations or teeth, and are keyed together by a member 21 serrated or toothed on its inner and outer surfaces to correspond with the serrations or teeth on the parts 19 and 20 respectively. If the members 19, 20 and 21 are separated, they can be relatively rotated and reengaged in a fresh position. Vernier adjustments may be obtained by this means. The member 19 is thus splined to the hub 20 while capable of adjustment relatively to it.

I claim:

1. In a windmill the combination with a shaft, of a hub secured thereon, a blade rotatable about its axis in said hub, said blade and said hub having mutually inclined slots, a weight separate from said blade guided to slide radially in said hub, a spring resisting outward motion of said weight, and a projection on said weight extending through the slots of said blade and hub.

2. In a windmill the combination with a shaft, of a hub secured thereon, a plurality of blades rotatable upon their axes in said hub, means dependent on the speed of rotation of the hub for turning the several blades about their axes, a slotted spider rotatable upon said hub, and projections one from each blade engaging in said slotted spider.

3. In a windmill the combination of a hub built in two parts, a plurality of blades, antifriction bearings having their outer races secured in said hub and their inner races secured to respective blades, weights separate from said blades sliding radially in said inner races, slotted extensions upon said races having their slots mutually inclined, projections on said weights extending through the slotted extensions of both inner and outer races, and a spring resisting outward movement of said weights.

4. In a windmill the combination of a hub, a plurality of blades automatically rotatable on their axes in said hub, a member determining the pitch setting of each blade at a given speed having a toothed periphery and lying in a toothed recess in said hub having a slightly different number of teeth, and a key member toothed on its inner and outer surface to correspond with said member and the toothed recess and engaging with both of them.

5. In a windmill the combination of a hub, a blade secured in said hub against radial movement and rotatable upon its axis in said hub, slotted members attached to said hub and blade respectively their slots being mutually inclined, a weight guided to move radially in said hub, a spring resisting outward movement of said weight, projections on said weight extending through the slotted members, and means for adjusting one of said slotted members about the axis of the blade relatively to the part to which it is attached.

6. In a windmill the combination of a hub, a ring of teeth upon said hub, a blade rotatable upon its axis in said hub having a slotted extension, a toothed and slotted member having its slots inclined to those of the slotted blade extension and its teeth differing in number from the ring of teeth upon the hub, a key member toothed to engage with said ring and with said toothed and slotted member, a radially movable weight, a spring pressing said weight inward, and projections upon said weight extending through the mutually inclined slots of said blade extension and said toothed and slotted member.

7. In a windmill the combination of a hub, a member splined to said hub, means for adjusting said member relatively to said hub through angular stops of less than one degree, a blade rotatable in said member, and means dependent on the speed of rotation of said hub for automatically turning said blade relatively to said splined member.

In testimony whereof I have signed my name to this specification this 30th day of September 1926.

FREDERICK NEWTON.